(12) United States Patent
Ahmed et al.

(10) Patent No.: US 11,762,157 B2
(45) Date of Patent: Sep. 19, 2023

(54) METHOD AND SYSTEM FOR ATTACHING OPTICAL FIBERS TO WARPED PHOTONIC CHIPS

(71) Applicant: Intel Corporation, Santa Clara, CA (US)

(72) Inventors: Sufi Ahmed, Chandler, AZ (US); Vineeth Abraham, Phoenix, AZ (US); Eric Moret, Beaverton, OR (US); Paul Diglio, Gaston, OR (US)

(73) Assignee: INTEL CORPORATION, Santa Clara, CA (US)

( * ) Notice: Subject to any disclaimer, the term of this patent is extended or adjusted under 35 U.S.C. 154(b) by 169 days.

(21) Appl. No.: 17/482,485

(22) Filed: Sep. 23, 2021

(65) Prior Publication Data

US 2022/0011529 A1    Jan. 13, 2022

(51) Int. Cl.
*G02B 6/42* (2006.01)
*G02B 6/36* (2006.01)
*G02B 6/38* (2006.01)

(52) U.S. Cl.
CPC ......... *G02B 6/4239* (2013.01); *G02B 6/3636* (2013.01); *G02B 6/3839* (2013.01)

(58) Field of Classification Search
None
See application file for complete search history.

(56) References Cited

U.S. PATENT DOCUMENTS

| | | | | |
|---|---|---|---|---|
| 5,832,149 A * | 11/1998 | Omizu | ................. | G02B 6/3508 385/20 |
| 6,529,670 B1 * | 3/2003 | Saito | ................... | G02B 6/3652 385/136 |
| 6,748,156 B2 * | 6/2004 | Saito | ................... | G02B 6/3652 385/136 |
| 7,491,287 B2 * | 2/2009 | Behr | ..................... | C08F 283/00 523/168 |
| 7,587,108 B2 * | 9/2009 | Carpenter | ............ | G02B 6/3636 385/137 |
| 8,447,157 B2 * | 5/2013 | Carpenter | ............ | G02B 6/3636 385/137 |
| 2003/0095776 A1 * | 5/2003 | Saito | ........................ | G02B 6/30 385/137 |
| 2006/0291782 A1 * | 12/2006 | Carpenter | ............ | G02B 6/3636 385/137 |
| 2006/0291793 A1 * | 12/2006 | Carpenter | ............ | G02B 6/3652 385/137 |
| 2007/0295446 A1 * | 12/2007 | Behr | ..................... | C08F 283/10 156/330 |
| 2010/0232743 A1 * | 9/2010 | Ishikawa | .............. | G02B 6/3636 385/88 |

\* cited by examiner

*Primary Examiner* — Jerry Rahll
(74) *Attorney, Agent, or Firm* — VIERING,JENTSCHURA&PARTNER mbB

(57) ABSTRACT

The present disclosure relates to a method including arranging multiple optical fibers between a die and a lid, wherein the die is bent and comprises multiple grooves, each optical fiber in or close to a separate groove; bonding the lid to the die to hold the multiple optical fibers in place in the multiple grooves, wherein the bonding comprises applying a bonding force non-uniformly across the lid to conform the lid to the bent die. A corresponding system is also disclosed herein.

20 Claims, 8 Drawing Sheets

METHOD AND SYSTEM FOR ATTACHING OPTICAL FIBERS TO WARPED PHOTONIC CHIPS

BACKGROUND

The current industry standard for enabling co-packaged optics on large packages is to passively align optical fibers with V-grooves in a photonic chip or die, which are then bonded in place using a glass buffer lid and a UV cured epoxy adhesive. But as the package becomes larger and thinner, warpage effects also increase, resulting in increased warpage variation in the V-grooves region in the die.

FIG. 1A shows an existing common bond head design for attaching 24 optical fibers to a warped die. Warpage of a concave shaped die 100 in large packages results in misalignment of the 24 optical fibers in the 24 channel V-grooves using a single bond head 102 over a glass lid 104 (e.g., 8 mm long), thereby leading to a high process signal loss (>4 dB signal loss) which results in significant yield loss.

FIG. 1B and FIG. 1C show a modelling/simulation data resulting from bonding with such warped die. In the simulation, it was calculated that an approximately 5 micrometers incoming warpage of the die combined with a 5 micrometers tilt of the lid resulted in approximately 85% loss (>2 dB signal loss).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which.

DETAILED DESCRIPTION

Figure 1A:
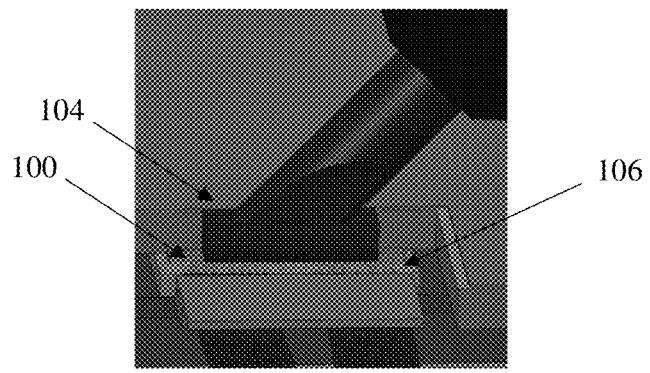
FIG. 1A shows an existing common bond head design for attaching 24 optical fibers to a warped die.
Figure 1B:
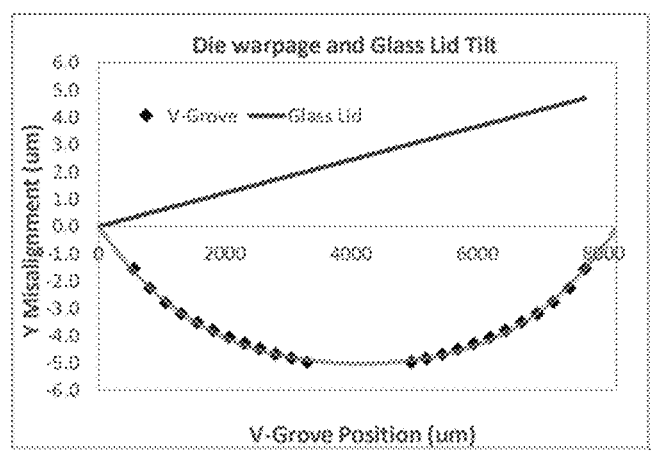
FIG. 1B shows a modelling/simulation data resulting from an approximately 5 micrometers incoming warpage of the die combined with a 5 micrometers tilt of the lid using the bond head design of FIG. 1A.
Figure 1C:
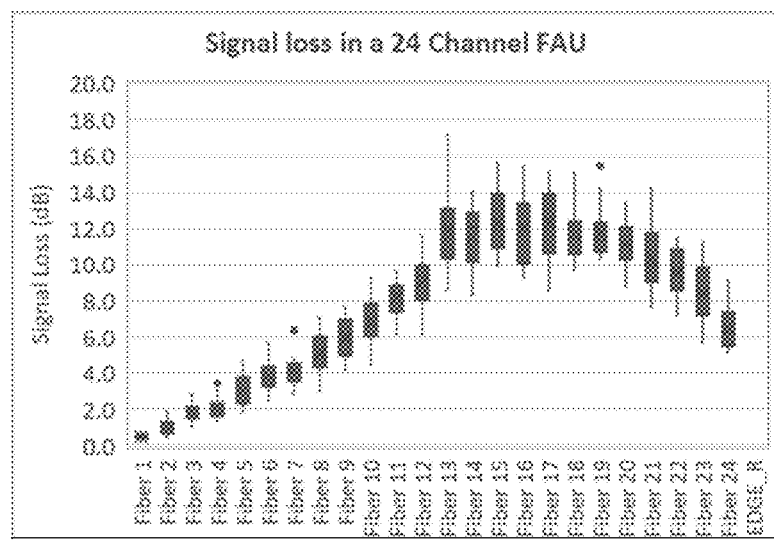
FIG. 1C shows the resultant signal loss in the warped die of FIG. 1A.

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for systems, and various aspects are provided for methods. It will be understood that the basic properties of the systems also hold for the methods and vice versa. Other aspects may be utilized and structural, and logical changes may be made without departing from the scope of the present disclosure. The various aspects are not necessarily mutually exclusive, as some aspects may be combined with one or more other aspects to form new aspects.

As used herein, the singular forms "a", "an" and "the" include support for plural referents unless the context clearly dictates otherwise.

The terms "front", "rear", "top", "bottom", and the like used herein and in the claims are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The present disclosure generally relates to a method. The method may include arranging multiple optical fibers between a die and a lid. The die may be bent. The die may include multiple grooves, each optical fiber in or close to a separate groove. The method may also include bonding the lid to the die to hold the multiple optical fibers in place in the multiple grooves. The bonding may include applying a bonding force non-uniformly across the lid to conform the lid to the bent die. In the present disclosure, a bent die may also be described as warped or non-planar.

The present disclosure generally further relates to a system. The system may include a die. The die may be bent. The die may include multiple grooves. The system may also include multiple optical fibers, each optical fiber in or close to a separate groove. The system may further include a lid over the die and the multiple optical fibers. The system may further include a bonding apparatus. The bonding apparatus may include a bond head section configured to make multiple contact points with the lid to conform the lid to the bent die.

Various aspects of the present disclosure may be directed to various designs or configurations of a bond head that may reduce optical fiber to V-grooves misalignment by conforming to the shape of a die. The bond head designs may be implemented with vacuum pickup capability, by including vacuum channels and one-way valves as needed, based on the design used.

Various aspects of the present disclosure may improve the assembly yield of the current V-grooves based optical co-package by 30% by reducing signal loss due to fiber misalignment. The proposed design may also improve the throughput time of the optical bonding, hence reduce manufacturing cost. A higher throughput time may also reduce the number of equipment needed to meet demand and may thus reduce capital expenditure.

To more readily understand and put into practical effect the present disclosure, particular aspects will now be described by way of examples and not limitations, and with reference to the drawings. For the sake of brevity, duplicate descriptions of features and properties may be omitted.

FIGS. 2A-2D show an aspect of the present disclosure for attaching optical fibers to warped photonic chips or dies by using dual bond heads with tilt adjustability.

A system 20 including a die 200, a bond head section 202, multiple bond heads 204a, 204b, and a lid 206 may be provided.

The die 200 may include multiple grooves, e.g., V-grooves, formed on a top surface of the die 200. Each V-groove may provide physical support and may act as a guide for an individual optical fiber. The system 10 may further include multiple optical fibers. In one aspect, each optical fiber may be in a separate V-groove. For example, the optical fibers may be placed in the V-grooves before the lid 206 is placed over them. In another aspect, each optical fiber may be close to a separate V-groove. For example, the optical fibers may first contact the lid 206, followed by positioning the lid 206 with the fibers over the V-grooves. In various aspects, the number of optical fibers and therefore, the number of V-grooves may be 12-24 per die. Other numbers may also be useful.

Figure 2A:
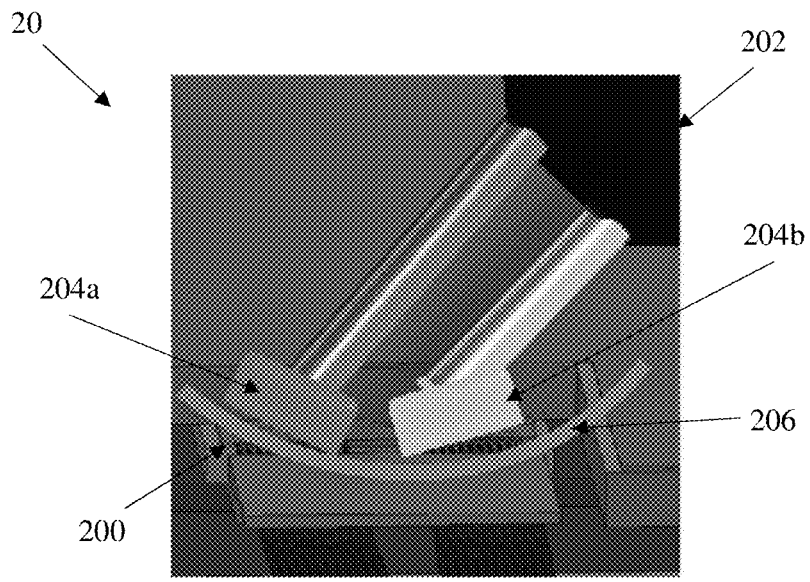
FIGS. 2A and 2B show a dual bond head with tilt adjustability resulting in compliance of a glass lid according to one aspect of the present disclosure.
Figure 2B:
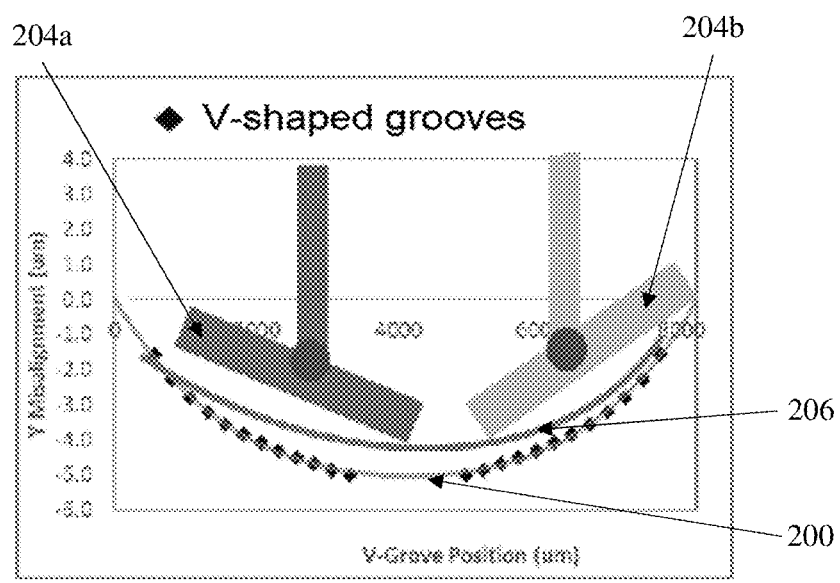

In various aspects, the die 200 may be bent or warped or even twisted. In other words, the top surface of the die 200 may not be planar. For example, as shown in FIG. 2B, the die 200 may be bent to form a "U" shape in a cross-section view. In another example, the die 200 may include an undulating or ripple cross-section.

Subsequent to placing the optical fibers in their respective V-grooves, the lid 206 may be pressed down upon the portion of the optical fibers that extend above the V-grooves, to hold each optical fiber securely in place in the V-grooves.

The bond head section 202 may be configured to make multiple contact points with the lid 206 to conform the lid 206 to the shape of the bent die 200. In various aspects, the multiple bond heads 204a, 204b may be connected to the bond head section 202 of a bonding apparatus (not shown). The bond heads 204a, 204b may be the portions of the bonding apparatus that make contact with the lid 206 during bonding. Although two bond heads 204a, 204b may be shown in FIGS. 2A and 2B, three or more bond heads may also be used. In the aspect shown in FIGS. 2A and 2B, the two bond heads 204a, 204b may contact the lid 206 at two different points or areas.

Each of the bond heads 204a, 204b may be freely rotatable, for example, via a pivot connection and the degree of rotation for each bond head may be independent of each other. Each of the bond heads 204a, 204b may be rotated to cover the warpage variation. In various aspects, each bond head 204a, 204b may rotate up to 1 degree with respect to a planar surface of an unbent die.

During bonding, a bonding force, such as mechanical force, may be applied to conform the lid 206 to the bent die. The lid 206 may be rigid. For example, the lid 206 may include a glass. In the aspect shown in FIGS. 2A and 2B, the bond heads 204a, 204b may be made to press against the lid 206, which in turn, may be made to press against the die 200. Since the bond heads 204a, 204b may be freely rotatable, the bond heads 204a, 204b may rotate and adapt to the contour of the bent die 200 during the bonding. In addition, due to the contour of the bent die 200, the force applied to bond the lid 206 to the bent die 200 may not be the same at various locations of the bent die 200.

The lid 206 may be any material suitable for bonding using an adhesive, such as epoxy or UV-curable adhesives.

Figure 2C:
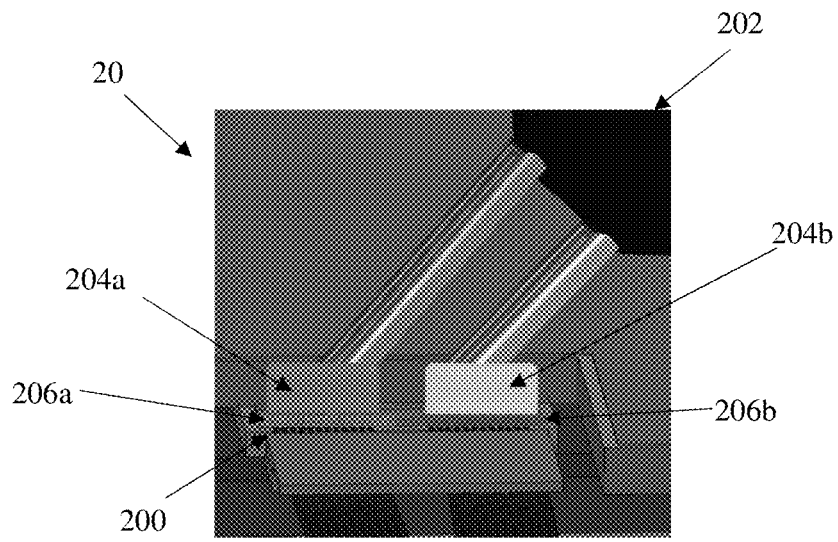
FIGS. 2C and 2D show a dual bond head with tile adjustability resulting in simultaneous bonding of two glass lids according to another aspect of the present disclosure.
Figure 2D:
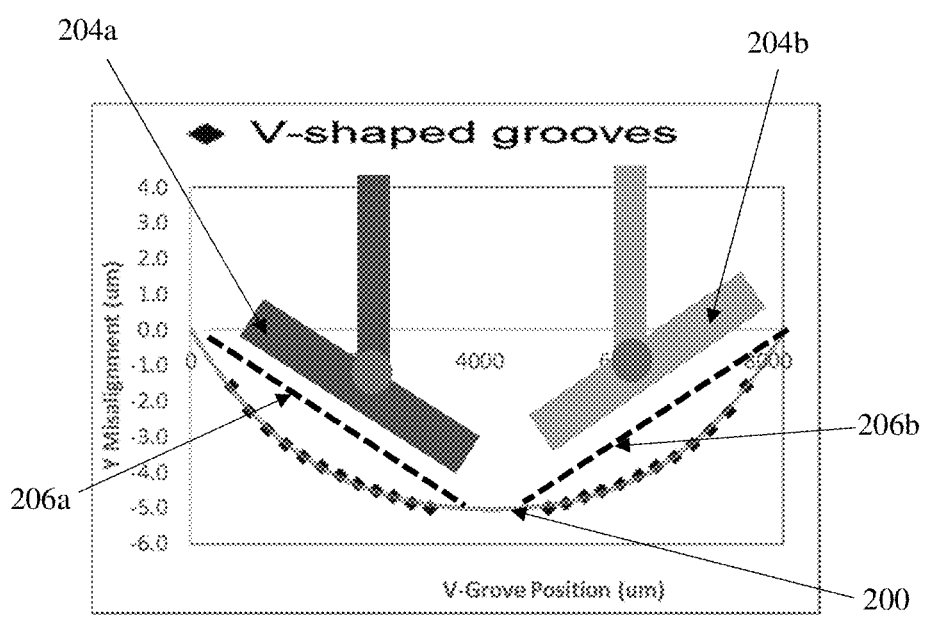

Instead of using a single lid 206, multiple, smaller lids 206a, 206b corresponding to the number of multiple bond heads 204a, 204b may also be used, as shown in FIGS. 2C and 2D. In one example, in the aspect shown in FIGS. 2A and 2B, the lid 206 may be a quartz glass of 8 mm long while in the aspect shown in FIGS. 2C and 2D, each of the lids 206a, 206b may be a quartz glass of 4 mm long. Conveniently but not necessarily, the lids 206a, 206b may be made of the same material and of the same size.

By using dual bond heads that may be tilted independently and used to either conform a single, large glass lid or bond two smaller glass pieces at the same time, this may enable better alignment of the optical fibers even with die warpage, without any throughput reduction. The bond section may be configured to include vacuum ports, so that it may also be used for lid pick and place during assembly.

Figure 3A:
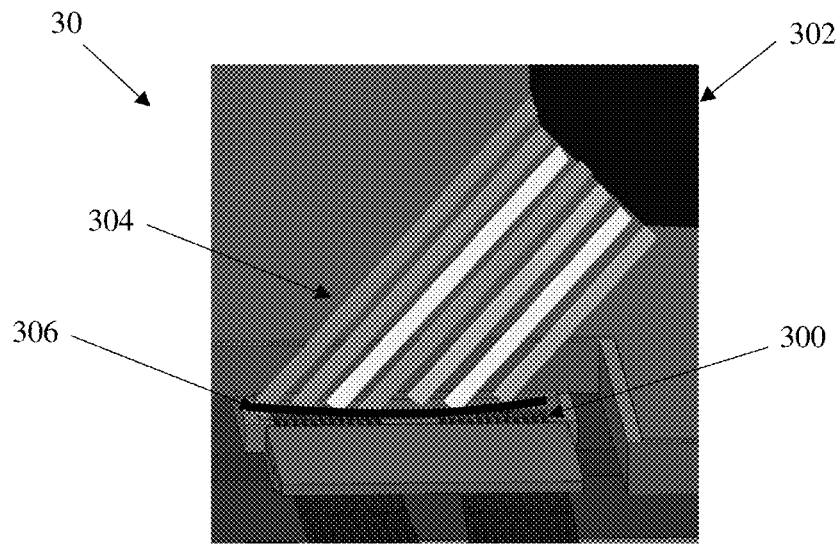
FIGS. 3A and 3B show individually controlled multiple bond heads resulting in conformal deformation of a lid and a single pass bonding according to one aspect of the present disclosure.
Figure 3B:
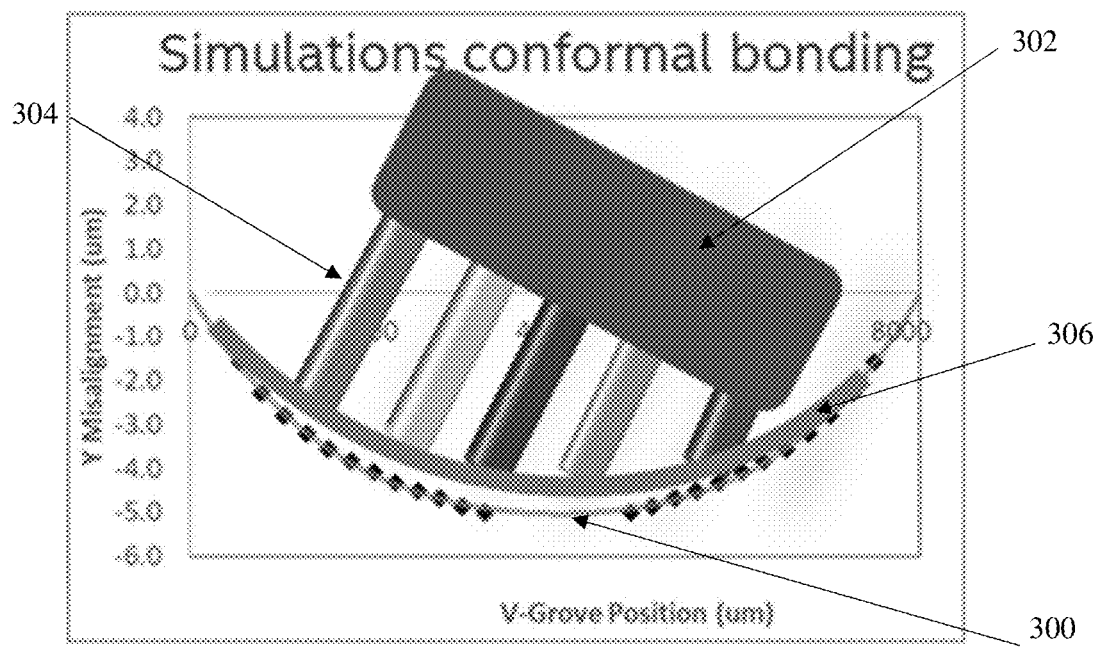

FIGS. 3A and 3B show individually controlled multiple bond heads resulting in conformal deformation of a lid and a single pass bonding according to one aspect of the present disclosure.

A system 30 including a die 300, a bond head section 302, multiple bond heads 304, and a lid 306 may be provided.

The die 300 and the bond head section 302 may be as described above with respect to FIGS. 2A-2D.

In the aspect shown in FIGS. 3A and 3B, instead of a solid bond head, the multiple bond heads 304 may be configured to include multiple individually controllable bond needles or fingers. In this configuration, the bond section 302 and the multiple bond heads 304 may resemble a brush. The multiple bond heads 304 may be resilient. Alternatively, the multiple bond heads 304 may be rigid.

In various aspects, the lid 306 may include a flexible material. In one aspect, the lid 306 may be a flexible silicone lid.

The multiple bond heads 304 or bond needles may be independently controlled by mechanical force or pressure actuators. The bond needles may further be individually controlled, and be mounted on a single gripper or end effector. In this manner, the bonding may happen in a single bonding pass. During bonding, the multiple bond heads 304 may push the lid 306 against the die 300 at various locations, causing the lid 306 to deform and to conform to the shape of the die 300. These needles may include vacuum channels with one way or vacuum valve, so that the bond heads may also be used for lid pick and place.

Figure 4:
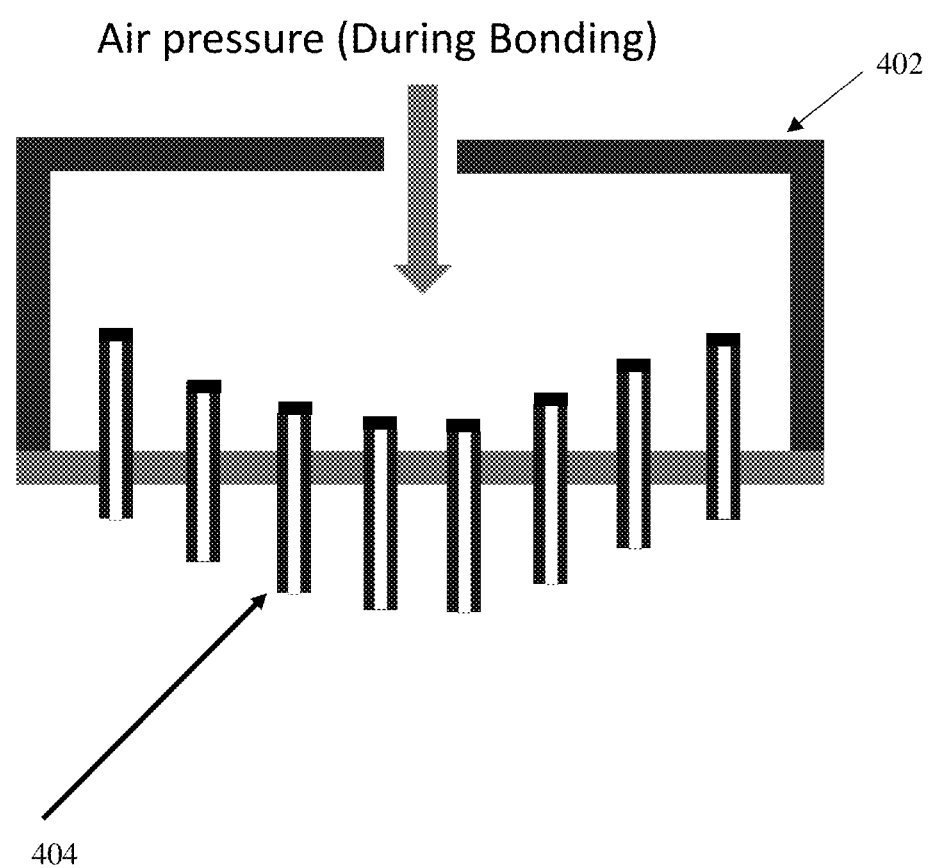
FIG. 4 shows an air pressure-controlled bond head section with multiple bond heads according to one aspect of the present disclosure.

FIG. 4 shows an air pressure-controlled bond head section with multiple bond heads according to one aspect of the present disclosure.

In the aspects shown in FIGS. 2A-2D and 3A-3B, the multiple bond heads may be permanently connected to the bond head section at an exterior surface of the bond head section.

However, in the aspect shown in FIG. 4, the multiple bond heads 404 may initially be residing inside a bond head section 402. The bond head section 402 may be air pressure-controlled.

The multiple bond heads 404 may be configured to include pressure regulated hollow bond needles. During bonding where air pressure may be supplied to the bond head section, the multiple bond heads 404 or needles may be simultaneously controlled by applying air pressure and protrude from the bond head section 402 to contact or push a lid (not shown). The lid may include a flexible material.

These bond heads 404 may result in a conformal deformation of a lid during a single pass bonding. Due to the contour of the die (not shown) which may be bent, the multiple bond heads 404 may protrude out of the bond head section 402 to different extent, thereby exerting force of different strength at different locations of the die. These bond heads may also have vacuum channels with one way or vacuum valve, so that the bond heads may also be used for buffer lid pick and place using vacuum.

Figure 5:
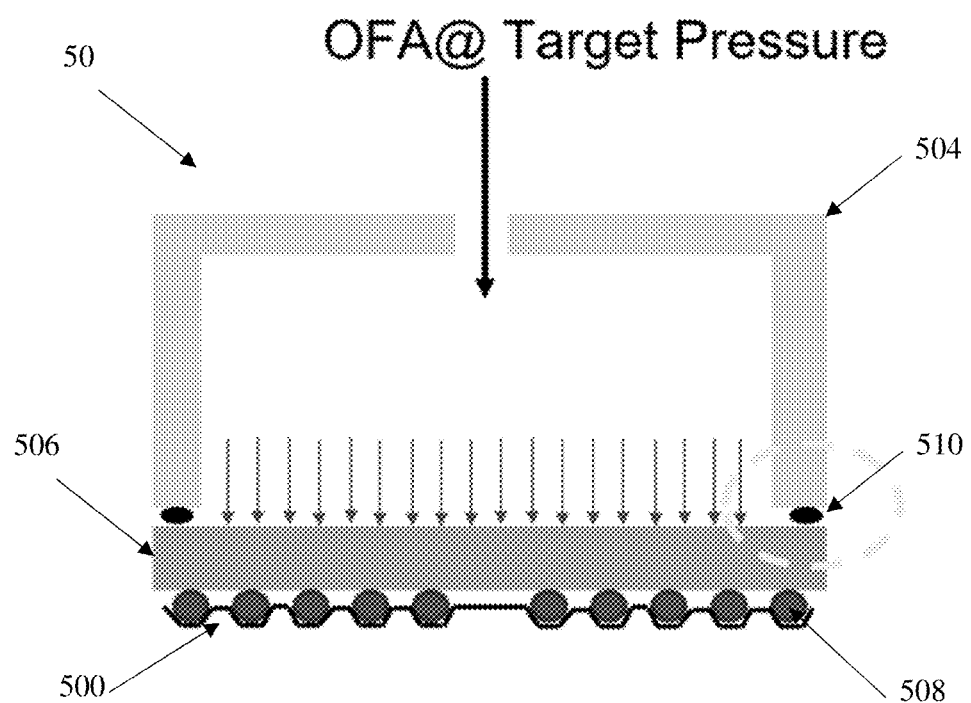
FIG. 5 shows an air pressure-controlled bond head with an interchangeable seal according to one aspect of the present disclosure.

FIG. 5 shows an air pressure-controlled bond head with an interchangeable seal according to one aspect of the present disclosure.

In FIG. 5, a system 50 may include a die 500 having multiple V-grooves may be provided. Multiple optical fibers 508 may be placed in the multiple V-grooves.

A lid 506 may be placed over the die 500. The lid 506 may include a flexible membrane that may be deformable.

A bond head 504 may be placed in contact with the lid 506. The bond head 504 may be hollow and configured to include a pressure seal 510 and an air pressure regulator (not shown). The lid 506 may be conformably deformed by applying air pressure to the hollow bond head 504. Due to the contour of the die, pressure of different strength at different locations of the die may be applied.

There may be pressure seal 510 (encircled by dashed lines) around the edges of the bond head 504 which may prevent air from leaking. Depending on the type of lid 506, different types of seals may be used. For example, O-ring seals may be used for high loads, flange (wedge) seals may be used for very low loads, or soft compressible seals may be used for low loads. The pressure seals 510 around the bond head 504 may be interchanged as needed. When vacuum is applied, the bond head 504 may also be used for lid pick and place.

Figure 6:
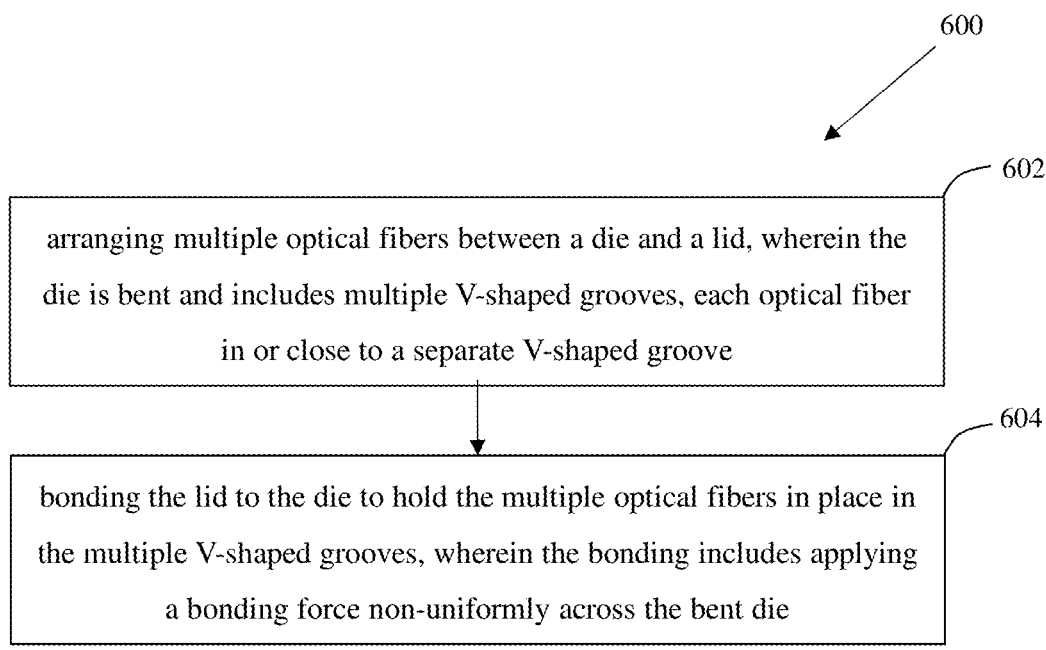
FIG. 6 shows a flow chart illustrating a method for attaching optical fibers to warped photonic chips according to an aspect of the present disclosure.

FIG. 6 shows a flow chart illustrating a method for attaching optical fibers to warped photonic chips according to an aspect of the present disclosure.

As shown in FIG. 6, at operation 602, the method 600 may include arranging multiple optical fibers between a die and a lid. The die may be bent and may include multiple V-grooves, each optical fiber in or close to a separate V-groove.

At operation 602, the method 600 may include bonding the lid to the die to hold the multiple optical fibers in place in the multiple V-grooves. The bonding may include applying a bonding force non-uniformly across the bent die.

It will be understood that the above operations described above relating to FIG. 6 are not limited to this particular order. Any suitable, modified order of operations may be used.

Examples

Example 1 may include a method including arranging multiple optical fibers between a die and a lid, wherein the die may be bent and may include multiple grooves, each optical fiber in or close to a separate groove; bonding the lid to the die to hold the multiple optical fibers in place in the multiple grooves, wherein the bonding may include applying a bonding force non-uniformly across the bent die.

Example 2 may include the method of example 1 and/or any other example disclosed herein, wherein applying the bonding force non-uniformly may include applying the bonding force at different angles at different locations of the die.

Example 3 may include the method of example 2 and/or any other example disclosed herein, wherein applying the bonding force non-uniformly may include applying mechanical force.

Example 4 may include the method of example 1 and/or any other example disclosed herein, wherein applying the bonding force non-uniformly may include applying the bonding force of different strengths at different locations of the die.

Example 5 may include the method of example 4 and/or any other example disclosed herein, wherein applying the bonding force non-uniformly may include applying air pressure.

Example 6 may include the method of example 1 and/or any other example disclosed herein, wherein the bonding force may be applied using multiple bond heads.

Example 7 may include the method of example 6 and/or any other example disclosed herein, wherein the bonding force may be applied using freely rotatable multiple bond heads.

Example 8 may include the method of example 6 and/or any other example disclosed herein, wherein the bonding force may be applied using non-rotatable multiple bond heads.

Example 9 may include the method of example 8 and/or any other example disclosed herein, wherein the bonding force may be applied using resilient multiple bond heads.

Example 10 may include the method of example 9 and/or any other example disclosed herein, wherein the bonding force may be applied using hollow multiple bond heads.

Example 11 may include a system and/or any other example disclosed herein, including a die, wherein the die may be bent and may include multiple grooves; multiple optical fibers, each optical fiber in or close to a separate groove; a lid over the die and the multiple optical fibers; and a bonding apparatus including a bond head section configured to make multiple contact points with the lid to conform the lid to the bent die.

Example 12 may include the system of example 11 and/or any other example disclosed herein, wherein the bond head section may include multiple bond heads.

Example 13 may include the system of example 12 and/or any other example disclosed herein, wherein each of the multiple bond heads may be independently freely rotatable to conform to the bent die.

Example 14 may include the system of example 12 and/or any other example disclosed herein, wherein each of the multiple bond heads may be independently controllable by mechanical force or pressure actuators.

Example 15 may include the system of example 14 and/or any other example disclosed herein, wherein each of the multiple bond heads may not be rotatable.

Example 16 may include the system of example 15 and/or any other example disclosed herein, wherein each of the multiple bond heads may be resilient.

Example 17 may include the system of example 12 and/or any other example disclosed herein, wherein the bond head section may be hollow and the multiple bond heads may reside inside the hollow bond head section.

Example 18 may include the system of example 17 and/or any other example disclosed herein, wherein the hollow bond head section may be air-pressure controlled.

Example 19 may include the system of example 18 and/or any other example disclosed herein, wherein the hollow bond head section may include pressure seals around edges of the hollow bond head section.

Example 20 may include the system of example 19 and/or any other example disclosed herein, wherein the pressure seals may include O-ring seals, flange seals, or soft compressible seals.

Example 21 may include a bonding apparatus including a bond head section configured to make multiple contact points with a lid to conform the lid to a bent die.

Example 22 may include the bonding apparatus of example 21 and/or any other example disclosed herein, wherein the bond head section may include multiple bond heads.

Example 23 may include the bonding apparatus of example 22 and/or any other example disclosed herein, wherein each of the multiple bond heads may be independently freely rotatable to conform to the bent die.

Example 24 may include the bonding apparatus of example 22 and/or any other example disclosed herein, wherein each of the multiple bond heads may be independently controllable by mechanical force or pressure actuators.

Example 25 may include the bonding apparatus of example 24 and/or any other example disclosed herein, wherein each of the multiple bond heads may not be rotatable.

Example 26 may include the bonding apparatus of example 25 and/or any other example disclosed herein, wherein each of the multiple bond heads may be resilient.

Example 27 may include the bonding apparatus of example 22 and/or any other example disclosed herein, wherein the bond head section may be hollow and the multiple bond heads may reside inside the hollow bond head section.

Example 28 may include the bonding apparatus of example 27 and/or any other example disclosed herein, wherein the hollow bond head section may be air-pressure controlled.

Example 29 may include the bonding apparatus of example 28 and/or any other example disclosed herein, wherein the hollow bond head section may include pressure seals around edges of the hollow bond head section.

Example 30 may include the bonding apparatus of example 29 and/or any other example disclosed herein, wherein the pressure seals may include O-ring seals, flange seals, or soft compressible seals.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

While the present disclosure has been particularly shown and described with reference to specific aspects, it should be understood by persons skilled in the art that various changes in form and detail may be made therein without departing from the scope of the present disclosure as defined by the appended claims. The scope of the present disclosure is thus indicated by the appended claims and all changes which come within the meaning and range of equivalency of the claims are therefore intended to be embraced.

What is claimed is:

1. A method comprising:
    arranging multiple optical fibers between a die and a lid, wherein the die is bent and comprises multiple grooves, each optical fiber in or close to a separate groove; bonding the lid to the die to hold the multiple optical fibers in place in the multiple grooves, wherein the bonding comprises applying a bonding force non-uniformly across the bent die.

2. The method of claim 1, wherein applying the bonding force non-uniformly comprises applying the bonding force at different angles at different locations of the die.

3. The method of claim 2, wherein applying the bonding force non-uniformly comprises applying mechanical force.

4. The method of claim 1, wherein applying the bonding force non-uniformly comprises applying the bonding force of different strengths at different locations of the die.

5. The method of claim 4, wherein applying the bonding force non-uniformly comprises applying air pressure.

6. The method of claim 1, wherein the bonding force is applied using multiple bond heads.

7. The method of claim 6, wherein the bonding force is applied using freely rotatable multiple bond heads.

8. The method of claim 6, wherein the bonding force is applied using non-rotatable multiple bond heads.

9. The method of claim 8, wherein the bonding force is applied using resilient multiple bond heads.

10. The method of claim 9, wherein the bonding force is applied using hollow multiple bond heads.

11. A system comprising:
    a die, wherein the die is bent and comprises multiple grooves;
    multiple optical fibers, each optical fiber in or close to a separate groove;
    a lid over the die and the multiple optical fibers; and
    a bonding apparatus comprising a bond head section configured to make multiple contact points with the lid to conform the lid to the bent die.

12. The system of claim 11, wherein the bond head section comprises multiple bond heads.

13. The system of claim 12, wherein each of the multiple bond heads is independently freely rotatable to conform to the bent die.

14. The system of claim 12, wherein each of the multiple bond heads is independently controllable by mechanical force or pressure actuators.

15. The system of claim 14, wherein each of the multiple bond heads is not rotatable.

16. The system of claim 15, wherein each of the multiple bond heads is resilient.

17. The system of claim 12, wherein the bond head section is hollow and the multiple bond heads reside inside the hollow bond head section.

18. The system of claim 17, wherein the hollow bond head section is air-pressure controlled.

19. The system of claim 18, wherein the hollow bond head section comprises pressure seals around edges of the hollow bond head section.

20. The system of claim 19, wherein the pressure seals comprise O-ring seals, flange seals, or soft compressible seals.

* * * * *